US009402278B2

United States Patent
Adams et al.

(10) Patent No.: US 9,402,278 B2
(45) Date of Patent: Jul. 26, 2016

(54) MULTI-MODE COMMUNICATION SYSTEM FOR A MOBILE PHONE

(75) Inventors: Damon Adams, Calgary (CA); Ambrose Tam, Calgary (CA); Carlos Aguirre-Charo, Calgary (CA)

(73) Assignee: Wireless Dynamics, Inc., Calgary, Alberta (CA)

( * ) Notice: Subject to any disclaimer, the term of this patent is extended or adjusted under 35 U.S.C. 154(b) by 0 days.

(21) Appl. No.: 13/304,615

(22) Filed: Nov. 25, 2011

(65) Prior Publication Data

US 2012/0135681 A1 May 31, 2012

Related U.S. Application Data

(60) Provisional application No. 61/417,399, filed on Nov. 26, 2010.

(51) Int. Cl.
*H04B 5/00* (2006.01)
*H04W 88/06* (2009.01)

(52) U.S. Cl.
CPC ............... *H04W 88/06* (2013.01); *H04B 5/00* (2013.01); *H04B 5/0025* (2013.01); *H04B 5/0062* (2013.01)

(58) Field of Classification Search
CPC ............ H04Q 5/22; G08B 13/14; H04B 5/00; H04W 88/06
USPC ........ 455/41.1, 41.2, 41.3, 67.11, 193.1, 274, 455/279.1, 15, 500, 88, 68, 73, 78; 340/572.7
See application file for complete search history.

(56) References Cited

U.S. PATENT DOCUMENTS

| | | | | |
|---|---|---|---|---|
| 8,355,670 | B2 * | 1/2013 | White | H04M 1/0274 361/727 |
| 2002/0047777 | A1 * | 4/2002 | Casden | G06K 7/0008 340/10.32 |
| 2004/0145928 | A1 * | 7/2004 | Takada | H02M 3/1584 363/95 |
| 2007/0008140 | A1 * | 1/2007 | Saarisalo | G06K 7/0008 340/572.7 |
| 2007/0066278 | A1 * | 3/2007 | Hong | H04B 1/006 455/405 |
| 2009/0058657 | A1 * | 3/2009 | Tuttle | G06K 7/10316 340/572.7 |
| 2009/0212917 | A1 * | 8/2009 | Chang | H04B 5/0062 340/10.1 |
| 2010/0123561 | A1 * | 5/2010 | Nam | G06K 7/0008 340/10.5 |
| 2010/0190437 | A1 * | 7/2010 | Buhot | H04B 5/06 455/41.1 |

(Continued)

FOREIGN PATENT DOCUMENTS

| | | |
|---|---|---|
| EP | 2211480 A1 | 7/2010 |
| GB | 2424349 A | 9/2006 |
| WO | WO2009/039419 A1 | 3/2009 |

*Primary Examiner* — MD Talukder
(74) *Attorney, Agent, or Firm* — Donald L. Bartels; Bartels Law Group (57) ABSTRACT

A multi-mode communication system for a mobile phone includes a plurality of antennas, a plurality of matching networks, each matching network connected to a respective one of said plurality of antennas, a plurality of near field devices, each near field device connected to a respective one of said plurality of matching networks, each pair of near field device and its associated matching network operative to either load modulate its antenna or generate an active magnetic field via its antenna, a plurality of switches, with one of said switches positioned between each of said matching networks and its respective antenna, and a controller for controlling the switched state of said plurality of switches such that one or more of said near field devices and their respective matching networks are selectively coupled to their respective antennas.

9 Claims, 9 Drawing Sheets

(56) References Cited

U.S. PATENT DOCUMENTS

| | | | | |
|---|---|---|---|---|
| 2011/0250839 A1* | 10/2011 | Lee | ................ | H04M 1/7253 455/41.1 |
| 2012/0083205 A1* | 4/2012 | Marcu | ................ | G06K 7/0008 455/41.1 |
| 2012/0135681 A1* | 5/2012 | Adams | ................ | H04B 5/0025 455/41.1 |
| 2012/0300871 A1* | 11/2012 | Schroeder | ................ | H01Q 21/28 375/295 |
| 2013/0281015 A1* | 10/2013 | Aho | ................ | H04B 5/0062 455/41.1 |

* cited by examiner

MULTI-MODE COMMUNICATION SYSTEM FOR A MOBILE PHONE

CROSS REFERENCE TO RELATED APPLICATION

This application claims the benefit of U.S. Provisional Application No. 61/417,399 filed Nov. 26, 2010, the entirety of which is hereby incorporated by reference.

BACKGROUND

Mobile communication devices, including cellular phones, personal digital assistants (PDAs), smart phones, other types of mobile phones, and the like, (herein also collectively referred to as mobile phones or smart phones) are being used not just for communication (voice and text), but also to take photos, send text messages, listen to music, surf the internet, do word processing, watch movies, and the like. Consumers are also becoming interested in using their mobile communication devices to perform various transactions (e.g., transfer funds, purchase products, etc.) traditionally provided by RFID tags, contact credit cards, and contactless credit cards.

Radio-frequency identification (RFID) is a technology that uses radio waves to transfer data from an electronic tag, called RFID tag or label, attached to an object, to an RFID reader for the purpose of identifying and performing some operation, e.g., tracking the object, payment of a transit fare, or performing some other transaction. Some RFID tags can be read from several meters away and beyond the line of sight of the reader. However, most such tags are short range, because they function using passive inductive coupling in the near-field, i.e., their range of operation is on the order of a few centimeters to a few tens of centimeters. The tag's information is stored electronically and typically includes an ID number and other stored data.

RFID tags typically contain at least two parts: an integrated circuit for storing and processing information, for modulating and demodulating a radio frequency (RF) signal, and for other specialized functions; and an antenna for receiving and transmitting the signal. An RFID reader transmits an encoded radio signal to interrogate the tag. The tag receives the message and responds with its identification information. The RFID reader typically is designed to enable it to discriminate between several tags that might be within the range of the RFID reader, enabling the almost parallel reading of tags.

Contactless smart cards are related to RFID tags but typically will also include writeable memory or microcontroller processing capability. Contactless smart cards are sometimes called contactless credit cards and include a Secure Element (SE) that enables communications between the card and the reader, e.g., a point of sale (POS) terminal, to be encrypted. Contactless smart cards are often used when transactions must be processed quickly or hands-free, such as on mass transit systems, where a smart card can be used to pay a transit fare without even removing it from a wallet. The standard protocol for contactless smart card communications is ISO 14443.

There are a variety of different RFID and contactless card standards and most operate in the 13.56 MHz Industrial Scientific and Medical (ISM) band residing within the High Frequency (HF) band. These include the ISO 14443 standard for contactless credit cards, e.g., Sony's Felica, NXP's Mifare, NXP's DESFire, all of which are commonly used for contactless transit fare payment; and the ISO 15693 standard for vicinity contactless smart cards, commonly used for access control. Pursuant to these various standards, the reader, RFID tag, and contactless smart card each have their own loop antenna, and employ inductive coupling at close range as the air interface to communicate with each other. The loop antenna of the reader and the loop antenna of the RFID tag (or to the contactless smart card) inductively couple to each other. This inductive mutual coupling is analogous to a weakly coupled transformer, where the degree of coupling varies with the position and orientation of the RFID tag or contactless smart card relative to the reader antenna. The field generated by the reader becomes weaker at more distant positions and for orientations of the RFID tag or contactless card that decrease the cross-sectional antenna area of the RFID tag or contactless card in the flux lines of the field generated by the reader. The reader actively generates a field and modulates it to transmit data to the RFID tag or contactless card. To receive the RFID tag or contactless card response, the reader ceases its own modulation, but continues to actively generate a field. The RFID tag inductively couples to the field generated by the reader, and operates by parasitically drawing power from the field. The RFID tag or contactless card applies passive load modulation to the reader-generated field to send data to the reader. The RFID tag or contactless card performs load modulation by varying the termination impedance applied to its own resonant antenna. This varying impedance is inductively coupled to the reader, modulating the load presented to the reader output, in turn modulating the field intensity and the voltage at the reader's receive port. Since the RFID tag or contactless smart card performs passive load modulation, rather than actively generating a field of its own, it does not require much power to operate, which makes it viable to operate parasitically off the reader's field.

Active RFID tags that have a battery or other self-contained source of power also exist, although they are less common. Active RFID tags are often used when an extended range of communication is desired.

Another category of near field device is also known in the art for operation in the HF band. This device is called a Near Field Communication (NFC) device and it operates at 13.56 MHz pursuant to its own set of protocols, e.g., ISO 18093 and ECMA 340. NFC devices enable simplified transactions, data exchange, and wireless connections between two devices in close proximity to each other. The essence of NFC is short-range wireless communication that is both safe and effective.

The maximum distance for near field devices is typically about 20 cms, which minimizes the possibility that an unauthorized communication will take place. The maximum distance for contactless smart cards is typically about 3 to 6 centimeters, and about 2 to 3 centimeters for NFC devices.

Many smart phones known in the art now contain embedded NFC devices to add 13.56 MHz proximity contactless functions, including card emulation, peer to peer, reader/writer, to mobile phones and other consumer electronic devices. This enables users of NFC enabled mobile phone to perform a range of additional capabilities not previously associated with mobile phones. These capabilities include: emulating a plastic contactless credit card to make NFC payments in a manner compatible with existing contactless point-of-sale readers; collecting and redeeming electronic coupons; accessing buildings and other secure areas having proximity reader controlled door locks; exchanging electronic business cards between devices; and tapping a smart poster to get additional production information from a web site. Nokia, for example, currently has a mobile phone with an embedded RFID tag that enables the phone to be used as a credit card and for accessing bank accounts.

Specialized microSD cards are also now available and, when inserted into a mobile phone, enable the phone to act as both a passive tag and an RFID reader. Using the microSD, a user's phone can be linked to bank accounts and used for mobile payments.

Figure 1:
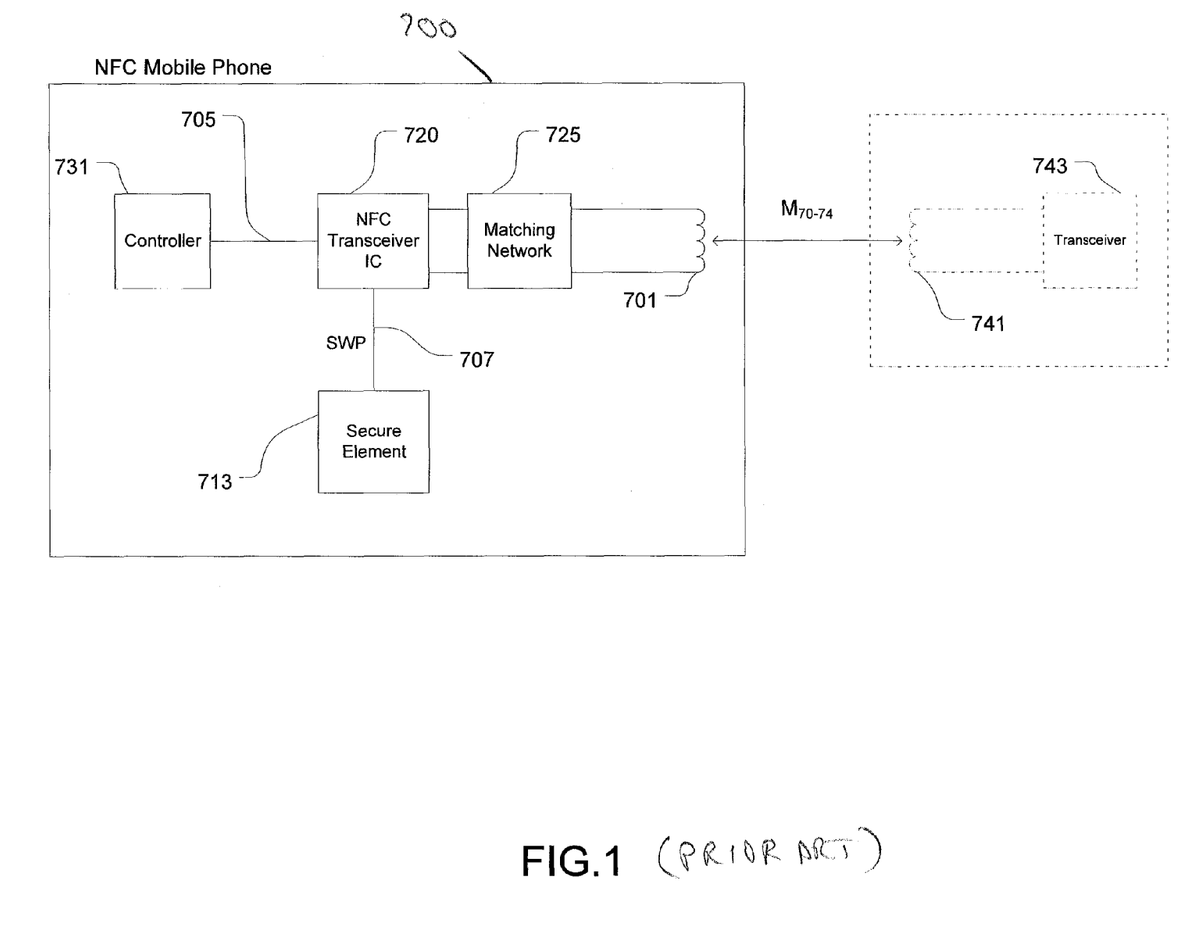
FIG. 1 is a functional block diagram and schematic of a prior art mobile phone having both an NFC device and a secure element.

FIG. 1 is an example of a prior art mobile phone that includes an embedded NFC system for enabling the mobile phone to perform both contactless payments and two-way NFC communications. As seen in FIG. 1, NFC device in mobile phone 700 includes a controller 731 for controlling the operation of an NFC transceiver IC 720 via an interface 705, such as a parallel general purpose I/O bus. Also connected to transceiver 720 is a secure element 713 via a second interface 707, such as a single wire protocol (SWP) interface. This protocol is typically used for communication between a secure element (SE) and an NFC transceiver. Transceiver 720 is connected to an antenna 701 via a conventional matching network 725 to enable the NFC system to communicate with an external transceiver 743 having an antenna 741 (shown in phantom).

The drawback of this system is that the SE is not directly attached to its own dedicated antenna, for receipt of contactless data, and load modulation of the antenna to send contactless data. There is only one antenna in the system, the antenna 701 connected to NFC transceiver 720 via matching network 725. The SE performs digital communication with the NFC transceiver 720 via SWP, and the transceiver 720 performs the analog load modulation of its antenna, on behalf of the SE. The NFC transceiver 720 matching network 725 is not optimal for passive load modulation on behalf of the SE, so there is a compromise in performance.

A limitation of the prior art is that these embedded systems or external cards being used with mobile phones use a single antenna for both the RFID/NFC transceiver and the secure element. These prior art devices are therefore required to compromise the design of their single antenna and circuit networks for the divergent requirements of different near field devices.

More specifically, the design and tuning of a single antenna and the design and topology of a single matching network cannot be simultaneously optimized for the divergent requirements of different modes of operation, e.g., where one near field device is generating an active field using the antenna, and where a second near field device operates to vary the termination impedance applied to the antenna to create passive load modulation of the reader's generated field. The result is compromised range and performance for both modes of operation.

For example, an optimal matching network topology for a specific RFID transceiver may include two stages, the first stage comprising a balanced series inductor, shunt capacitor low pass filter stage, and the second stage comprising another balanced series/shunt capacitor stage for additional matching. The low pass filter stage is necessary to attenuate spurious emissions produced during active field generation, to comply with regulatory requirements that limit the allowable level of unintentional radiated emissions. The antenna used with active field generation requires wider printed circuit board traces, to support high current during active field generation.

The optimal matching network for a contactless SE, whose ISO 14443 interface employs passive load modulation, is completely different. The optimal circuit topology between the SE and the antenna is a single resonating capacitor. As the SE does not actively transmit any field, no filter stage is necessary to comply with regulatory requirements. For this mode of operation, an antenna with narrower traces is sufficient, as the contactless SE does not generate an active field, so the currents are lower.

SUMMARY OF THE INVENTION

The following summary of the invention is included in order to provide a basic understanding of some aspects and features of the invention. This summary is not an extensive overview of the invention and, as such, it is not intended to particularly identify key or critical elements of the invention or to delineate the scope of the invention. Its sole purpose is to present some concepts of the invention in a simplified form as a prelude to the more detailed description that is presented below.

Broadly stated, one embodiment of a multi-mode communication system for a mobile phone, comprises: a plurality of antennas; a plurality of matching networks, each matching network connected to a respective one of said plurality of antennas; a plurality of near field devices, each near field device connected to a respective one of said plurality of matching networks, each pair of near field device and its associated matching network operative to either load modulate its antenna or generate an active magnetic field via its antenna; a plurality of switches, with one of said switches positioned between each of said matching networks and its respective antenna, and a controller for controlling the switched state of said plurality of switches such that one or more of said near field devices and their respective matching networks are selectively coupled to their respective antennas.

A second embodiment of the invention comprises a method for operating a multi-mode mobile communication system to provide near field communication functionality for a mobile phone, wherein said system includes a plurality of near field devices coupled to respective matching networks that are each coupled to a separate antenna through a switch, comprising: determining a mode of operation for said system; selectively controlling the state of each said switch so that said mode of operation is enabled; and detecting when to end said mode of operation.

A preferred embodiment of the present invention comprises a hand-held, near-field, multi-mode communication device for a mobile phone comprising of a plurality of near field devices, including transceivers and/or transponders (secure elements) and associated electromagnetic near-field antennas, for transmitting to, and/or receiving from, an external device. A plurality of switches control the connection of the near field devices to their respective antennas, to isolate the non-operating near field devices and their matching networks. A controller controls the switched state of said plurality of switches, and selects one of a plurality of predetermined modes of operation available on said hand-held, near-field, multi-mode communication device. By turning off all the antenna switches except those needed for the desired operating mode, the range and performance of the near field devices is improved.

According to a preferred embodiment of the present invention, multiple antennas are located in close physical proximity to each other within the volume constraints of the device. The switches act as an isolation device to reduce or eliminate the coupled loading effect of the non-operating near field device(s) and their respective matching networks on the active near field device and its respective matching network.

In one embodiment where the near field devices comprise an RFID transceiver and a secure element, when the switch connecting the secure element to its antenna is open, the secure element antenna loop is broken. As a result, during RFID transceiver operation, the coupled loading of the secure element antenna and its associated resonating capacitor is eliminated. When the RFID antenna switch is open, the effect of the RFID transceiver antenna on the secure element's antenna is mostly eliminated. As a result, during contactless payment transactions, the coupled loading of the RFID transceiver and matching network is eliminated.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Figure 2:
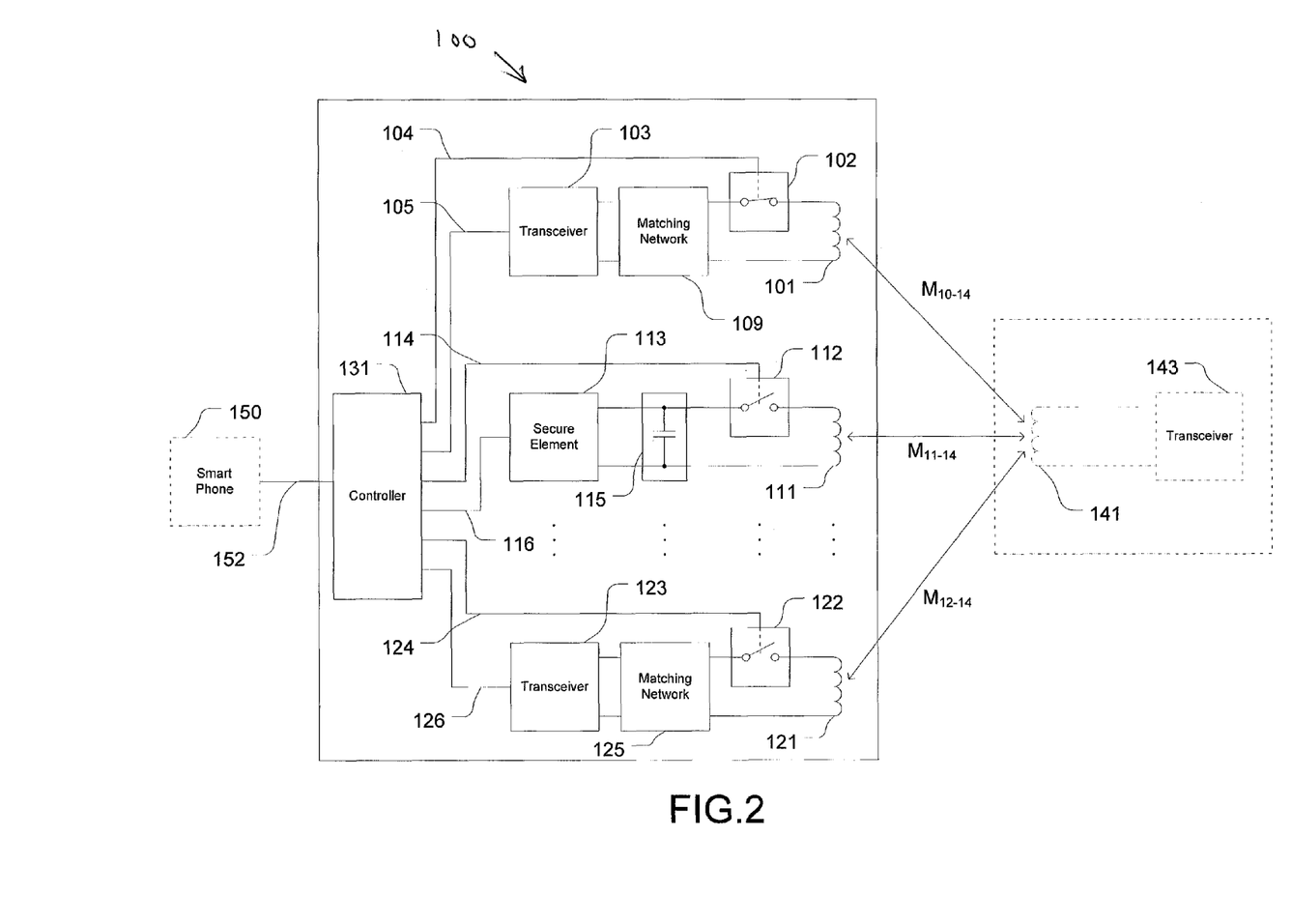
FIG. 2 is a functional block diagram and schematic of a multi-mode communication system for a mobile phone according to one embodiment of the invention.

An embodiment of a multi-mode adapter according to one embodiment of the invention is shown at 100 in FIG. 2. In this embodiment, controller 131 is a Texas Instruments MSP430 microcontroller with digital general purpose output pins. Other microprocessors and dedicated controllers known in the art are also suitable for this function. In one embodiment, antenna 101 is an electromagnetic near-field loop antenna. Other antennas known in the art are also suitable for this function. In one embodiment, transceiver 103 is a Texas Instruments TRF7970A NFC and radio frequency identification reader and writer (NFC/RFID Reader Writer) IC. Matching network 109 in one embodiment is an RF matching network known in the art having two filter networks as described above.

In one embodiment, switches 102 and 122 are CEL uPG2406TK Gallium Arsenide switches and switch 112 is a CEL uPG2189 Gallium Arsenide switch. Other switches known in the art are also suitable. Switch 102 is preferably positioned between antenna 101 and transceiver 103 to connect them when the switch 102 is closed, and to disconnect them when the switch 102 is open. Control line 104 connects one of the general purpose outputs of controller 131 to the control pin of switch 102 to control the switching state of said switch.

In one embodiment, controller 131 is connected to NFC/RFID Reader Writer 103 via an SPI interface 105, or other suitable interface such as parallel general purpose I/O bus. Controller 131 is connected to a mobile phone 150, e.g., a host mobile phone, smart phone, or tablet computer. In one embodiment, controller 131 is connected to mobile phone 150 via a UART interface 152, or other suitable interface such as USB.

In one embodiment, antenna 111 is an electromagnetic near-field loop antenna. Other antennas known in the art are also suitable for this function. In one embodiment, near field device 113 is a NXP P5CD072 secure element module with a GlobalPlatform compliant operating system and a credit card payment application loaded into internal EEPROM memory. Other suitable secure elements having a contactless interface for connection to an antenna are known in the art. Attached to the output pins of said secure element 113 is a resonating capacitor 115. In one embodiment, switch 112 is positioned in the path between antenna 111 and smart element 113, to connect them when the switch is closed, and disconnect them when the switch is open. Control line 114 connects one of the general purpose outputs of controller 131 with the control pin of switch 112. In one embodiment, controller 131 is connected to smart element 113 via ISO 7816 interface 116, or other suitable interface that may be supported by the smart element, such as USB.

In one embodiment, antenna 121 is an electromagnetic near-field loop antenna. Other antennas known in the art are also suitable for this function. In one embodiment, near field device 123 is a Sony Felica RC-S860 contactless smart card IC transceiver, with a transit fare payment application loaded into its memory. Other suitable RFID tags, including an NXP Semiconductor MF3MOD4101DA4/04 DESFire Smart Card IC are useable as near field device 123. Attached to the output pins of near field device 123 is a matching network 125, which in one embodiment is a second resonating capacitor. Switch 122 is positioned in the path between antenna 121 and near field device 123, to connect them when the switch is closed, and disconnect them when the switch is open. Control line 124 connects one of the general purpose outputs of controller 131 with the control pin of switch 122.

During operation of system 100, the exemplary external near field device to which system 100 communicates is shown in phantom at 143 with its associated antenna 141.

Figure 3:
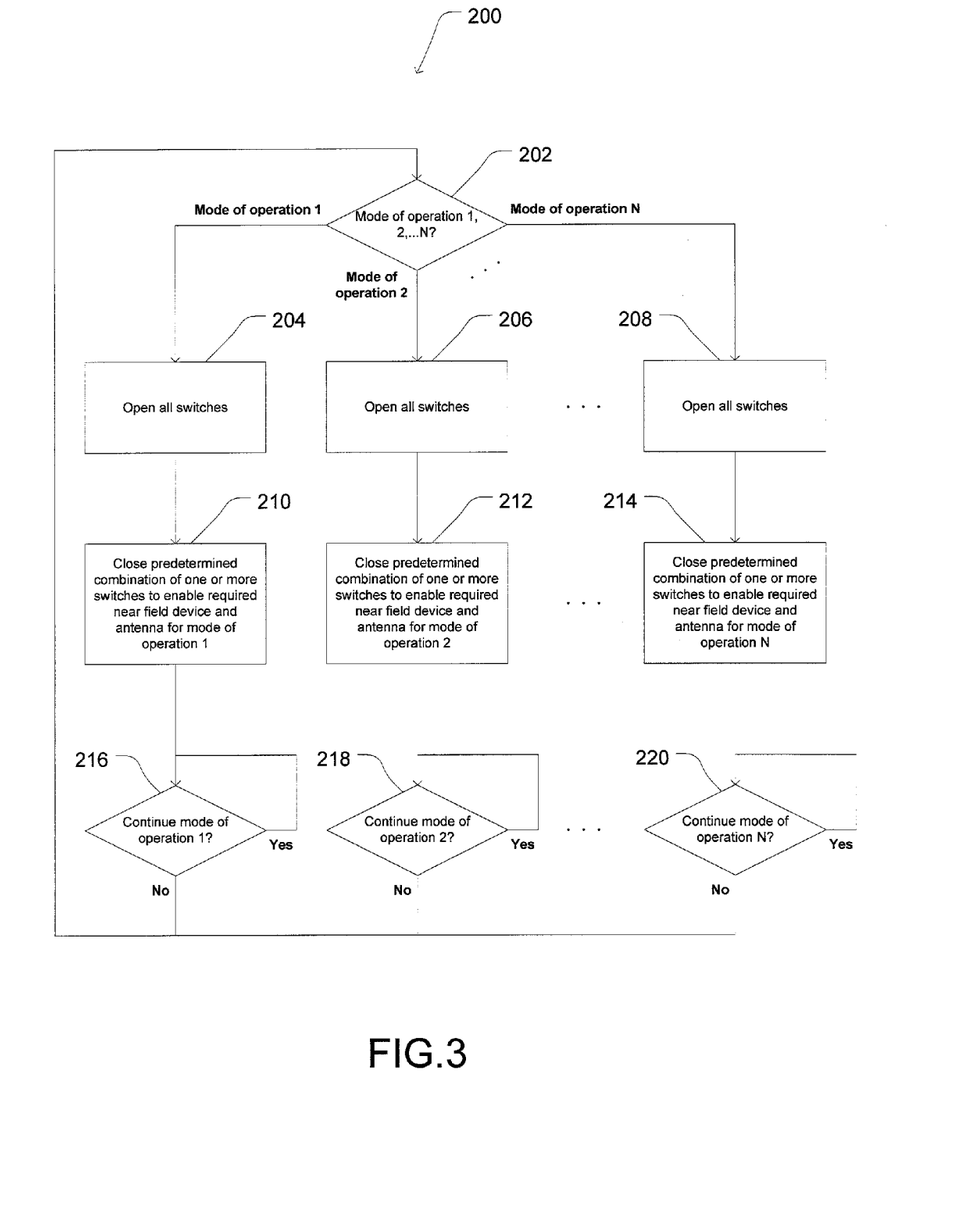
FIG. 3 is a flow chart of the operation of a multi-mode communication system for a mobile phone according to one embodiment of the invention.

FIG. 3 is a flow chart of a method for operating a multi-mode communication system for a mobile phone according to one embodiment of the invention. As seen in FIG. 3, a method according to one embodiment for operating a multi-mode mobile communication system is shown at 200 and includes determining, as shown at 202 which of 1-N modes of operation is to be performed by said system. In one embodiment, as shown at 204, 206 and 208, once one of said modes of operation is selected, all of the switches in the system that connect the respective near field devices to their respective antennas are opened. For each mode of operation selected, as seen at 210, 212, and 214, the system causes those switches to close to enable the selected near field device and antenna to perform the selected mode of operation. Lastly, the method detects when to end the selected mode of operation, as seen at 216, 218, and 220.

Exemplary modes of operation of the multi-mode communication system according to the invention are as follows:

I. Contactless Payment Mode of Operation (Mode 1)

Controller 131 opens all switches, for break-before-make transition between modes, then closes switch 112, connecting antenna 111 to near field device (secure element) 113 and resonating capacitor 115, thereby enabling a contactless credit card payment transaction with an external contactless payment reader, represented by the transceiver 143 and antenna 141, shown in phantom in FIG. 2, by magnetic field induction employing mutual coupling $M_{11-14}$ between antennas 111 and 141. Controller 131 coordinates and controls secure element 113 via an ISO 7816 interface during contactless transactions between secure element 113 and external Point-of-Sale contactless terminal. Controller 131 interacts with a User Interface software application on host smart phone 150.

II. Two-way NFC Mode of Operation (Mode 2)

Controller 131 opens all switches, for break-before-make transition between modes, then closes switch 102, thereby connecting antenna 101 to near field device 103, an NFC transceiver, and enabling two way NFC communication with an external NFC device, represented by the transceiver 143 and antenna 141, shown in phantom in FIG. 2, by magnetic field induction employing mutual coupling $M_{10-14}$ between antennas 101 and 141. With switch 112 open, secure element 113 and resonating capacitor 115 are disconnected from the antenna 111, breaking that circuit loop. Thus, secure element 113 and resonating capacitor 115 are de-coupled from, and do not present a coupled load to, any circuit connected to antenna 101. Controller 131 coordinates and controls NFC/RFID transceiver 103 via SPI interface 105 during RFID read/write of external RFID tag (not shown in FIG. 1) in field. Controller 131 interacts with a User Interface software application on host smart phone 150.

III. RFID Reader Mode of Operation (Mode 3)

Controller 131 opens all switches, for break-before-make transition between modes, then closes switch 102, connecting antenna 101 to transceiver 103, thereby enabling radio frequency identification read of external radio frequency identification tag, represented by the module 143 and antenna 141, shown in phantom in FIG. 2, by magnetic field induction employing mutual coupling $M_{10-14}$ between antennas 102 and 141.

IV. RFID Writer Mode of Operation (Mode 4)

Controller 131 opens all switches, for break-before-make transition between modes, then closes switch 102, connecting antenna 101 to transceiver 103, thereby enabling radio frequency identification write of external radio frequency identification tag, represented by the module 143 and antenna 141, shown in phantom in FIG. 2, by magnetic field induction employing mutual coupling $M_{10-14}$ between antennas 102 and 141.

V. Transit Fare Mode of Operation (Mode 5)

Controller 131 opens all switches, for break-before-make transition between modes, then closes switch 122, connecting antenna 121 to transceiver 123, thereby enabling transit fare payment with external transit system reader, represented by the module 143 and antenna 141, shown in phantom in FIG. 2, by magnetic field induction employing mutual coupling $M{12-14}$ between antennas 122 and 141.

Figure 4:
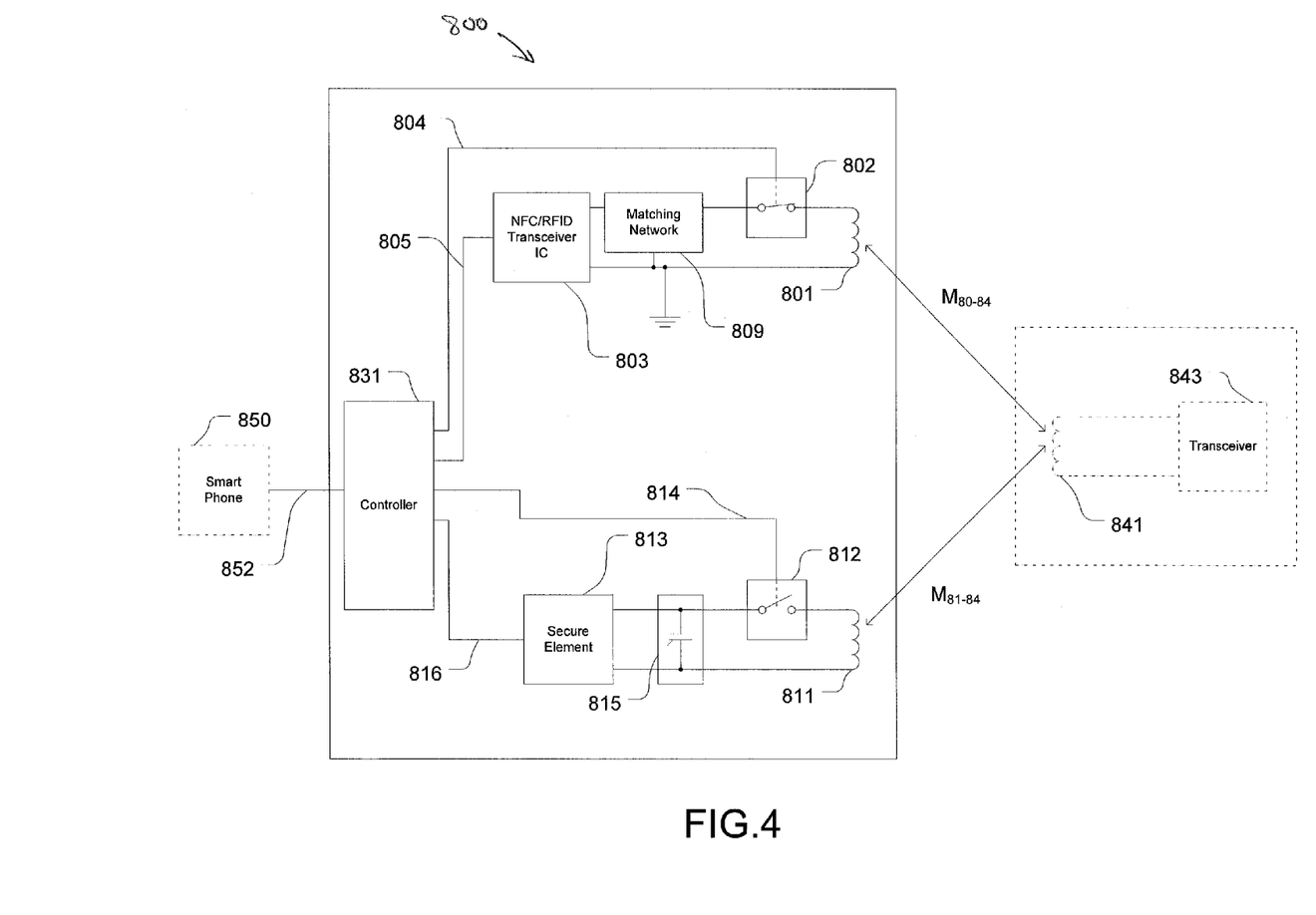
FIG. 4 is a functional block diagram and schematic of a multi-mode communication system for a mobile phone according to a second embodiment of the invention.

FIG. 4 is a functional block diagram and schematic of a multi-mode communication system for a mobile phone according to a second embodiment of the invention. As seen in FIG. 4, the multi-mode communication system 800 includes first and second antennas 801 and 811. A matching network 809 is connected to first antenna 801. A resonant capacitor 815 is connected to the second antenna 811. A first near field device 803 is connected to matching network 809. In one embodiment, first near field device 803 is a conventional NFC/RFID transceiver IC. A second near field device 813 is connected to a second matching network comprising a resonant capacitor 815. In one embodiment, second near field device 813 is a conventional secure element. A first switch 802 is connected between matching network 809 and first antenna 801 and a second switch 812 is connected between resonant capacitor 815 and second antenna 811. A controller 831 controls the switched state of said first and second switches 802, 812 via respective control lines 804 and 814 such that only one of said near field devices 803, 813 is selectively coupled to its respective antenna at any given time. Controller also is connected to near field devices 803, 813 by respective bus lines 805 and 816. Communication between the host mobile phone 850 and controller 831 is by bus line 852. During operation of system 800, the exemplary external near field device to which system 800 communicates is shown in phantom at 843 with its associated antenna 841.

Figure 9:
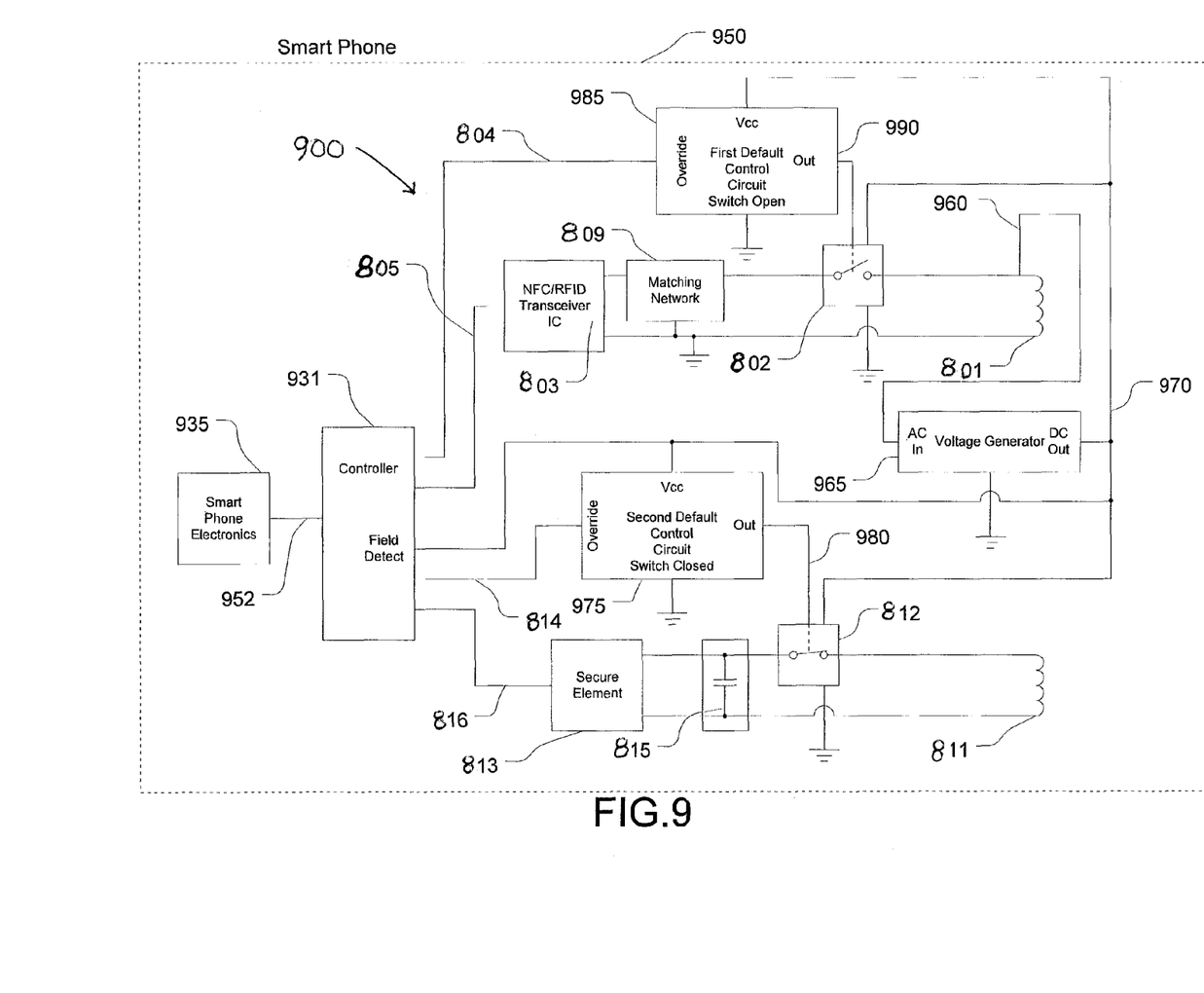
FIG. 9 is a functional block diagram and schematic of a multi-mode communication system for a mobile phone according to a third embodiment of the invention.

Note in the embodiment shown in FIG. 4, the multimode communication system 800 is external to mobile phone 850. As illustrated in FIG. 9, any embodiment of multimode communication system according to the invention can also be embedded in the mobile phone.

Figure 5:
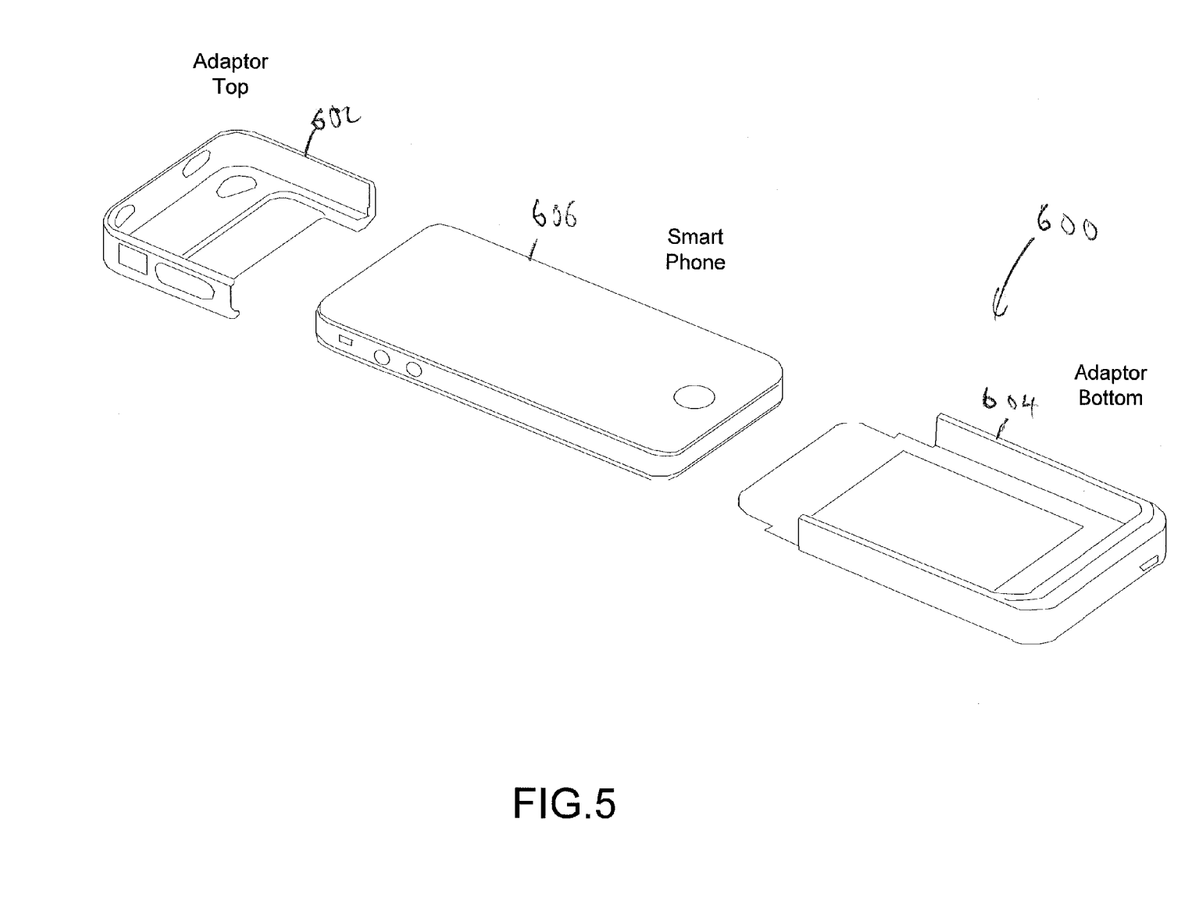
FIG. 5 is a partially exploded perspective view of an adaptor incorporating a multi-mode communication system for a smart phone having a shape that enables it to be attached as a sleeve to the mobile phone according to one embodiment of the invention.
Figure 6:
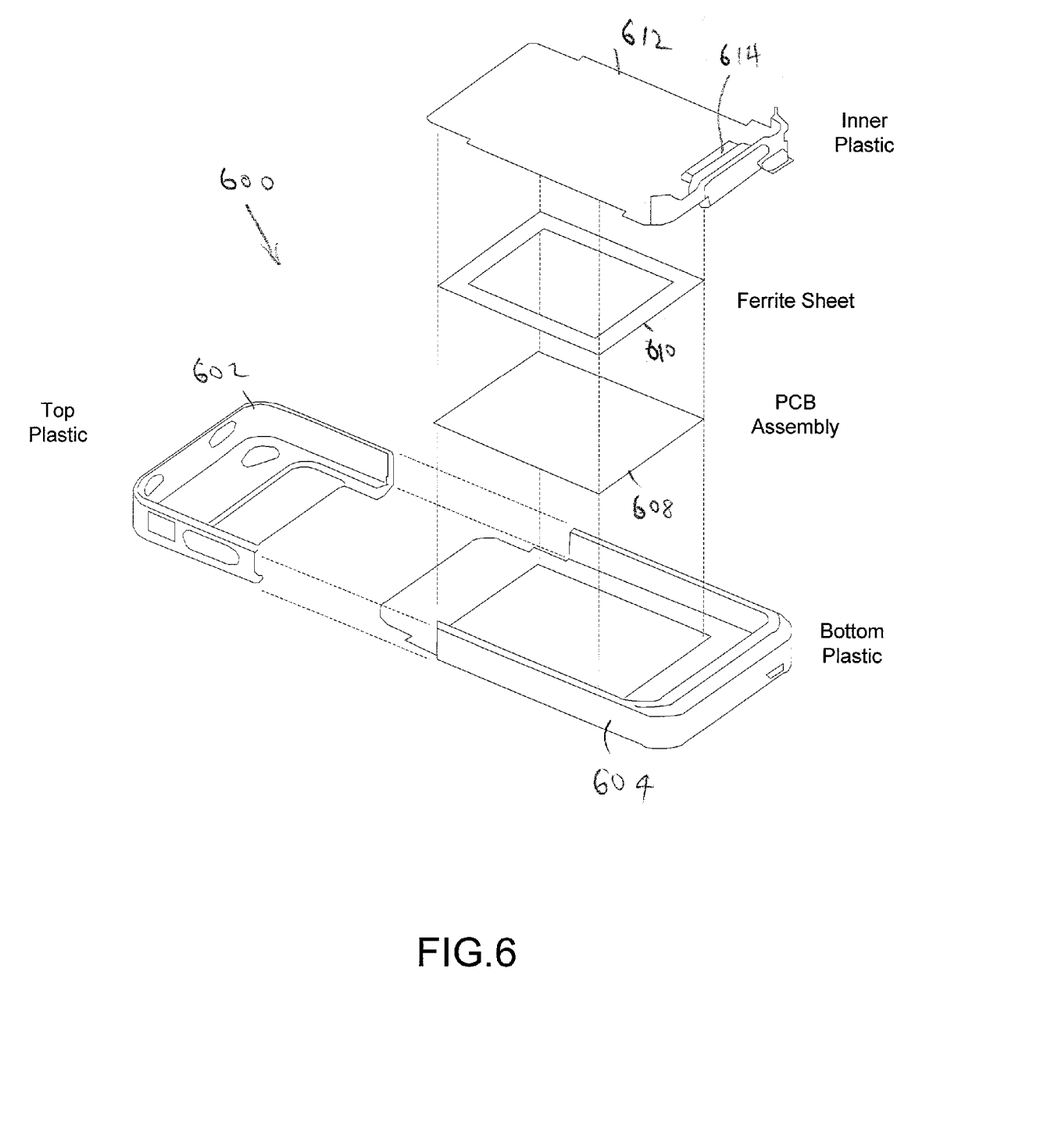
FIG. 6 is a partially exploded perspective view of the adaptor of FIG. 5 showing the position of various components of the adaptor according to one embodiment of the invention.

FIG. 5 is a partially exploded perspective view of an adaptor incorporating a multi-mode communication system for a smart phone having a shape that enables it to be attached as a sleeve to the mobile phone according to one embodiment of the invention. FIG. 6 is a partially exploded perspective view of the adaptor of FIG. 5 showing the position of various components of the adaptor according to one embodiment of the invention. FIGS. 5 and 6 show the device in a sleeve/cradle/sled industrial design or form factor such as an adaptor for an iPhone 4 smart phone. The device is similar industrial design of form-factor could be customized for other smart phones, mobile phones, and tablets.

As seen in FIG. 5, in one embodiment of the system of the invention, the system is formed in the shape of an adaptor 600 having a top 602 and a bottom 604 that, when joined together, securely fit around a mobile phone 606. As seen in FIG. 6, adaptor 600 includes a printed circuit board (PCB) 608, a ferrite sheet 610 and an inner plastic sheet 612 that fit together in bottom 604 of adaptor 600 in such a fashion that they do not obstruct the sliding of bottom 604 around mobile phone 606.

Figure 7:
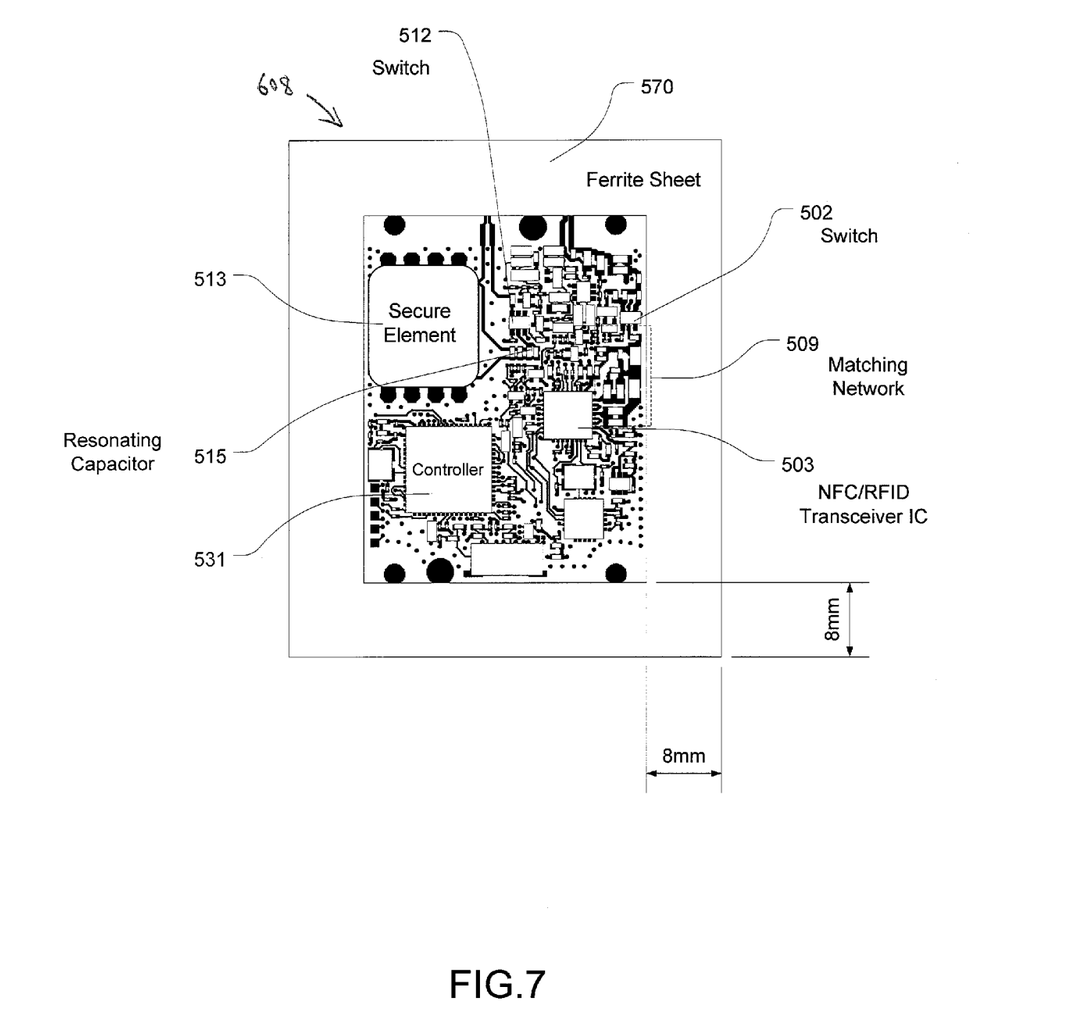
FIG. 7 is a top view of an exemplary printed circuit containing components of the multi-mode communication system according to the present invention.
Figure 8:
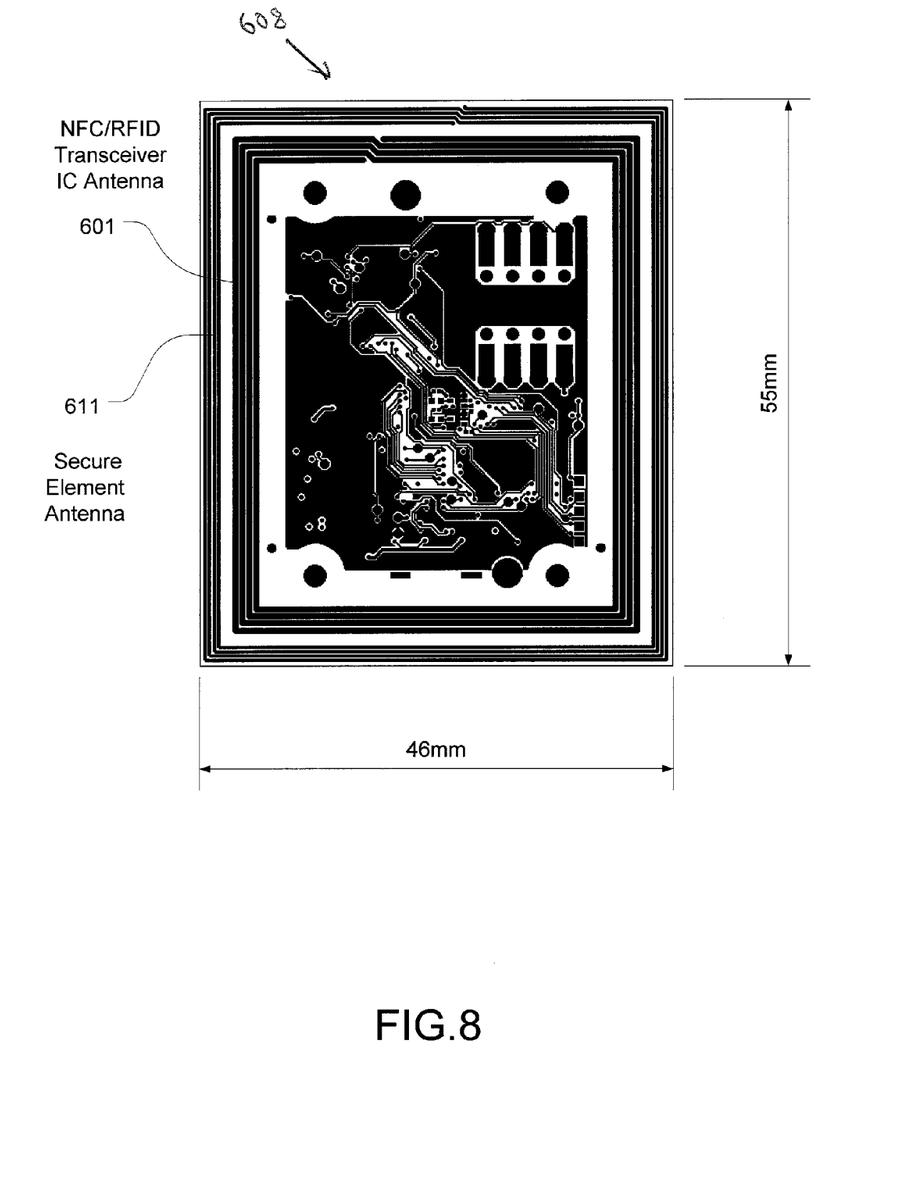
FIG. 8 is a bottom view of the exemplary printed circuit shown in FIG. 7.

The various circuit elements of the system of the invention, as described above with respect to FIGS. 2 and 3 and as will be described below in FIGS. 7-9 are all mounted on PCB 608. Ferrite sheet 610 is for isolating the antennas formed on PCB 608 from the mobile phone 606. Inner plastic sheet 612 is to cover the PCB 608 and ferrite sheet 610. As is also seen in FIG. 6, inner plastic sheet 612 includes a connector 614 for enabling the system of the invention to be connected to the mobile phone 606's conventional data interface plug.

FIG. 7 is a top view of an exemplary printed circuit board 608 that contains components of the multi-mode communication system according to the present invention and FIG. 8 is a bottom view of the exemplary printed circuit 608 shown in FIG. 7. As seen in FIG. 6, PCB 608 includes switches 502 and 512, an NFC/RFID transceiver 503 and its matching network 509, secure element 513 and its resonating capacitor 515, and controller 531. Also shown in FIG. 7 is the placement of the ferrite sheet 570 on the surface of PCB 608. As seen in FIG. 8, the bottom side of PCB 608, the ferrite sheet footprint matches the footprint area taken up by antennas 601 and 611, to shield these antennas from the adjacent mobile phone when adaptor 600 is jacketing the mobile phone. Note that antenna 601, for the NFC/RFID transceiver has thicker traces than the antenna 611 used by the secure element. As described above, this is because there is a greater amount of current that antenna 601 has going through it when the NFC/RFID transceiver is operating.

FIG. 9 is a functional block diagram and schematic of a multi-mode communication system 900 for a mobile phone according to a third embodiment of the invention. In FIG. 9, components corresponding to the components shown in FIG. 4 have the same numbers. As seen in FIG. 9, system 900 is embedded in mobile phone 950 rather than external to the mobile phone, as seen in FIG. 4. Mobile phone 950 includes smart phone electronics 935 to which system 900 is coupled.

As also seen in FIG. 9, in this embodiment a voltage generator 965 is included in system 900. Voltage generation 965 is connected to antenna 801 via line 960 and functions to generate a voltage from antenna 801 by magnetic induction from a magnetic field when mobile phone 950 is positioned in an area where such a field is being generated by an external device. Voltage generator 965 provides sufficient power to enable the connection of said secure element and resonant capacitor to said second antenna, thus enabling secure element transactions even when the mobile phone 950 is off.

In one embodiment, the output of voltage generator 965 is connected to switch 812 and to first and second default control circuits 985 and 975 as well as to a field detect input of controlled 931. In operation, when an external magnetic field is sufficient to generate a voltage on line 970 via generator 965, the first and second default control circuits are powered up and operate to disconnect switch 802 via line 990 and connect switch 812 via line 980.

As is seen, by using multiple antennas, the invention allows for the circuit network topology, antenna size, antenna shape, number and antenna windings, antenna inductance, Q-factor, and frequency response tuning to be individually optimized for each RFID transceiver IC, smart element, and RFID tag function in the invention. This is an advantage over the prior art, which must compromise its single antenna and circuit network for the divergent requirements of RFID transceiver and load-modulated NFC functions. As a result, the invention's multiple antennas achieve longer range and better performance than the prior art. The invention can accommodate RFID transceivers, smart elements, and RFID tags not originally designed for NFC. The invention is not dependant on, nor limited to, smart elements with I2S, SWP, and microSD interfaces.

The invention can be easily and flexibly scaled to a multiplicity of transceivers, multiplicity of smart elements, and multiplicity of RFID tags in a single device, each with its own antenna and switches. The invention can accommodate arbitrary combinations of RFID transceivers, smart elements, and RFID tags. Thereby, the invention can incorporate combinations of multiple contactless protocols, for example ISO 15693 in combination with Felicia, that are not available in a single smart element or RFID tag.

The present invention has been described in relation to particular examples, which are intended in all respects to be illustrative rather than restrictive. Those skilled in the art will appreciate that many different combinations of circuits will be suitable for practicing the present invention. Moreover, other implementations of the invention will be apparent to those skilled in the art from consideration of the specification and practice of the invention disclosed herein. It is intended that the specification and examples therein be considered as exemplary only, with a true scope of the invention being indicated by the following claims.

What is claimed is:

1. A multi-mode communication system for a mobile phone, comprising:
   a plurality of antennas;
   a plurality of switches;
   a plurality of matching networks;
   a plurality of near field devices, each near field device coupled to a respective one of said antennas via one of said switches positioned in a path between said near field device and its respective antenna such that, when the switch is closed, it connects said near field device to its respective antenna, and such that, when the switch is open, said near field device is disconnected from its respective antenna;
   one of said plurality of matching networks positioned in the path between each said near field device and its respective antenna, each said near field device and its associated matching network operative to either load modulate its respective antenna or generate an active magnetic field via its respective antenna;
   a controller for separately controlling the switched state of each said switch such that one or more of said near field devices are selectively coupled to their respective antennas; and
   a voltage generator for generating a voltage from one of said antennas by magnetic induction from a magnetic field when said field is being generated by an external device, to provide sufficient power to enable at least one of said switches to connect its associated near field device to its respective said antenna, and
   wherein one of said near field devices is a secure element.

2. The multi-mode mobile communication system of claim 1, wherein said system is embedded in the mobile phone.

3. The multi-mode mobile communication system of claim 1, wherein said system is part of an adaptor having an interface connector, said connector for enabling the connection of said system to the mobile phone.

4. The multi-mode mobile communication system of claim 3, wherein said adaptor is sized to be a sleeve attachable to said mobile phone.

5. The multi-mode mobile communication system of claim 1, further comprising a controller interface, and wherein said controller is controlled by said mobile phone by means of said controller interface.

6. The multi-mode mobile communication system of claim 1, wherein one or more of said near field devices is an NFC transceiver.

7. The multi-mode mobile communication system of claim 1, wherein one or more of said NFC devices is an RFID reader/writer.

8. The multi-mode mobile communication system of claim 1, wherein one or more of said NFC devices is an RFID tag.

9. A multi-mode communication system for a mobile phone, comprising:
   first and second antennas;
   a matching network;
   a resonant capacitor;
   a first near field device connected to said matching network;
   a second near field device comprising a secure element connected to said resonant capacitor;
   a first switch connected between said matching network and said first antenna;
   a second switch connected between said resonant capacitor and said second antenna;

a controller for controlling the switched state of said first and second switches such that only one of said near field devices is selectively coupled to its respective antenna at any given time; and a voltage generator for generating a voltage from one of said antennas by magnetic induction from a magnetic field when said field is being generated by an external device, to provide sufficient power to enable said second switch to connect said secure element and resonant capacitor to said second antenna.

* * * * *